US010794571B2

(12) United States Patent
Vavrik et al.

(10) Patent No.: US 10,794,571 B2
(45) Date of Patent: Oct. 6, 2020

(54) DISTURBANCE SENSING SYSTEM FOR AN AUTOMATED MOVING-MIRROR LUMINAIRE

(71) Applicant: Robe Lighting s.r.o., Roznov pod Radhostem (CZ)

(72) Inventors: Jindrich Vavrik, Zubri (CZ); Tomas Micunek, Roznov pod Radhostem (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 16/518,428

(22) Filed: Jul. 22, 2019

(65) Prior Publication Data

US 2019/0346114 A1 Nov. 14, 2019

(51) Int. Cl.
*F21V 14/04* (2006.01)
*H02K 11/21* (2016.01)
*F21V 7/00* (2006.01)

(52) U.S. Cl.
CPC ............ *F21V 14/04* (2013.01); *F21V 7/0008* (2013.01); *H02K 11/21* (2016.01)

(58) Field of Classification Search
CPC ........ F21V 14/04; F21V 7/0008; H02K 11/21
USPC ....................................................... 359/877
See application file for complete search history.

(56) References Cited

U.S. PATENT DOCUMENTS

| 9,217,559 | B2 | 12/2015 | Rasmussen et al. | |
|---|---|---|---|---|
| 10,274,175 | B1 | 4/2019 | Wood et al. | |
| 2004/0208006 | A1* | 10/2004 | Schneider | F21V 7/0008 362/292 |
| 2009/0231852 | A1 | 9/2009 | Vinter et al. | |
| 2011/0169433 | A1* | 7/2011 | Lundell | H02P 3/26 318/372 |
| 2015/0008907 | A1* | 1/2015 | Janisch | G01D 5/145 324/207.25 |
| 2015/0205094 | A1* | 7/2015 | West | G02B 26/0816 359/862 |
| 2015/0276181 | A1* | 10/2015 | Jiang | F21V 14/04 362/284 |

* cited by examiner

*Primary Examiner* — Collin X Beatty
(74) *Attorney, Agent, or Firm* — Conley Rose, P.C.; Grant Rodolph; Brooks W Taylor (57) ABSTRACT

A luminaire includes a mirror, a motion assembly, and a control system. The mirror controllably deflects a light beam emitted from the luminaire. The motion assembly includes a motor, a magnet mounted directly to a shaft of the motor, and a motion sensor system. The motor rotates the mirror about an axis of rotation. Rotation of the motor causes an equal change in rotation of the mirror. The magnet's center aligns with the shaft's axis of rotation and the magnet's magnetic pole is oriented orthogonally to the shaft's axis of rotation. The motion sensor system produces an output signal representing an absolute rotational position of the magnet. The control system stores an expected rotational position of the motor and determines whether the motion sensor system's output signal matches the stored position. When the output signal does not match the stored position, the control system rotates the motor position where the output signal matches the stored position.

16 Claims, 7 Drawing Sheets

DISTURBANCE SENSING SYSTEM FOR AN AUTOMATED MOVING-MIRROR LUMINAIRE

TECHNICAL FIELD OF THE DISCLOSURE

The disclosure generally relates to automated luminaires, and more specifically to a disturbance sensing system for an automated moving-mirror luminaire.

BACKGROUND

Luminaires with automated and remotely controllable functionality (referred to as automated luminaires) are well known in the entertainment and architectural lighting markets. Automated luminaires are commonly used in theatres, television studios, concerts, theme parks, night clubs, and other venues. Automated luminaires may provide remote control over several parameters of an emitted light beam, such as intensity, color, focus, beam size, beam shape, and beam pattern.

Another parameter that an automated luminaire may provide control over is a direction of the emitted light beam and thus a position of the light beam on a stage or in a studio. Such direction or position control is typically performed using one of two alternative systems. In one system, a luminaire head is mounted in a yoke that provides control of the head's position in two orthogonal rotational axes. Such luminaires may be referred to as moving-yoke luminaires. In another system, the light beam is directed from a stationary luminaire via a mirror that can be remotely tilted and rotated to controllably deflect the light beam. Such luminaires may be referred to as a moving-mirror luminaires. Automated luminaires are often installed for a first show and then relocated and installed again for a second show. Thus, automated luminaires are often installed in a temporary manner for a specific show, then moved, carried, and/or transported to another venue.

Automated moving-mirror luminaires have an advantage over moving-yoke luminaires because the mirror is lightweight, allowing the mirror (and thus the reflected beam) to be moved very rapidly. However, the mirror is fragile and needs to be protected while still allowing full range of motion for the reflected light beam. Even when the mirror is protected, its position may still be disturbed, for example by being accidentally knocked or otherwise moved. It would therefore be advantageous if lightweight sensors could be provided to report the current position of the mirror in both pan and tilt axes so as to detect whether the position of the mirror has been disturbed.

SUMMARY

In a first embodiment, a luminaire includes a mirror, a motion assembly, and a control system. The mirror is configured to controllably deflect a light beam emitted from the luminaire. The motion assembly includes a motor mechanically coupled to the mirror, a magnet mounted directly to a shaft of the motor, and a motion sensor system. The motor is configured to rotate the mirror about a mirror axis of rotation, where a change in a rotational position of a shaft of the motor relative to a body of the motor causes an equal change in a rotational position of the mirror. A center of the magnet is aligned with an axis of rotation of the shaft and a magnetic pole of the magnet is oriented orthogonally to the shaft axis of rotation. The motion sensor system is configured to produce an output signal representing an absolute rotational position of the magnet. The control system is electrically coupled to the motor and the motion sensor system. The control system stores an expected rotational position of the motor and determines whether the motion sensor system output signal matches the stored expected rotational position. When the output signal does not match the stored expected rotational position, the control system causes the motor to rotate to a rotational position where the motion sensor system output signal matches the stored expected rotational position.

In a second embodiment, a luminaire includes a mirror, a tilt motion assembly, a pan motion assembly, and a control system. The mirror is configured to controllably deflect a light beam emitted from the luminaire. The tilt motion assembly includes a tilt motor mechanically coupled to the mirror, a tilt magnet mounted directly to a shaft of the tilt motor, and a tilt motion sensor system. The tilt motor is configured to rotate the mirror about a tilt axis of rotation, where a change in a rotational position of a tilt shaft of the tilt motor relative to a body of the tilt motor causes an equal change in a rotational position of the mirror. A center of the tilt magnet is aligned with an axis of rotation of the tilt shaft and a magnetic pole of the tilt magnet is oriented orthogonally to the tilt shaft axis of rotation. The tilt motion sensor system is configured to produce a tilt output signal representing an absolute rotational position of the tilt magnet. The pan motion assembly includes a pan motor mechanically coupled to the tilt motion assembly, a pan magnet mounted directly to a shaft of the pan motor, and a pan motion sensor system. The pan motor is configured to rotate the tilt motion assembly about a pan axis of rotation, where a change in a rotational position of a pan shaft of the pan motor relative to a body of the pan motor causes an equal change in a rotational position of the tilt motion assembly. A center of the pan magnet is aligned with an axis of rotation of the pan shaft and a magnetic pole of the pan magnet is oriented orthogonally to the pan shaft axis of rotation. The pan motion sensor system is configured to produce a pan output signal representing an absolute rotational position of the pan magnet. The control system is electrically coupled to the pan and tilt motors and the pan and tilt motion sensor systems. The control system stores an expected pan rotational position of the pan motor and an expected tilt rotational position of the tilt motor. The control system determines whether the tilt motion sensor system output signal matches the stored expected tilt rotational position and, when the tilt output signal does not match the stored expected tilt rotational position, causes the tilt motor to rotate to a rotational position where the tilt motion sensor system output signal matches the stored expected tilt rotational position. The control system also determines whether the pan motion sensor system output signal matches the stored expected pan rotational position and, when the pan output signal does not match the stored expected pan rotational position, causes the pan motor to rotate to a rotational position where the pan motion sensor system output signal matches the stored expected pan rotational position.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Many automated moving-mirror luminaires operate without position encoding on the mirror because of the extra weight and restriction on movement caused by position encoding systems. An automated moving-mirror luminaire according to the disclosure includes magnetic rotational sensors on both the pan and tilt axis motors. The magnets sensed by the sensors are extremely lightweight and minimally impede the motion or speed of the mirror movement. The sensors report the current rotational position of both pan and tilt motors back to a control system, which can then determine if the mirror has been moved by an outside force away from its expected position. If the mirror (and thus the motor) has been moved, the control system can take corrective action to position the mirror in its expected position.

Figure 1:
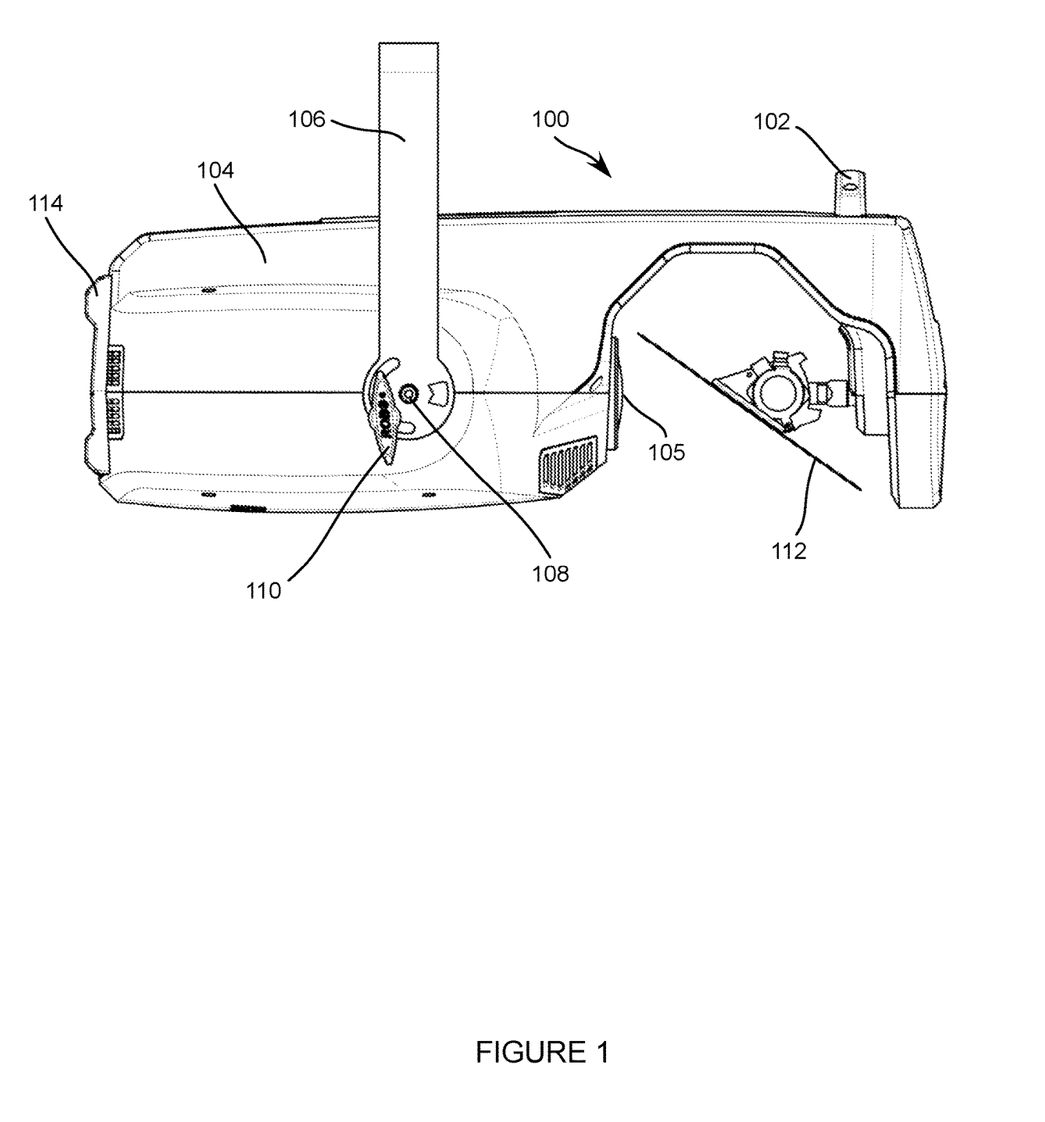
FIG. 1 presents a side view of an automated moving-mirror luminaire according to the disclosure.

FIG. 1 presents a side view of an automated moving-mirror luminaire 100 according to the disclosure. The automated moving-mirror luminaire 100 comprises a main body 104. When the automated moving-mirror luminaire 100 is installed for use, it is supported by suspension yoke 106 that pivots around a pivot point 108 and is clamped in position through a locking knob 110. A light beam from an internal light source (not shown) is emitted from the main body 104 through a lens 105 and impinges on a mirror 112 from whence it is controllably deflected by movement of the mirror 112 in two orthogonal axes to direct the light beam as desired by a user. A carrying handle 102 is positioned on a side of the housing 104, at the mirror end of the housing 104. A foot 114 is located at an opposite end of the housing 104 to enable the automated moving-mirror luminaire 100 to rest stably in a vertical orientation.

The automated moving-mirror luminaire 100 may include stepper motors to move the mirror 112. A stepper motor is an accurate device for relative movement. Each step of the stepper motor represents a fixed amount of rotation of the output shaft; thus, it is possible to move a stepper motor from one angular position to another angular position with great precision. This allows, in turn, accurate positioning of the mirror 112 within the automated moving-mirror luminaire 100. However, this positioning is relative, not absolute; that is, a stepper motor cannot tell if it has been moved out of position (or disturbed) by some outside force.

Figure 2:
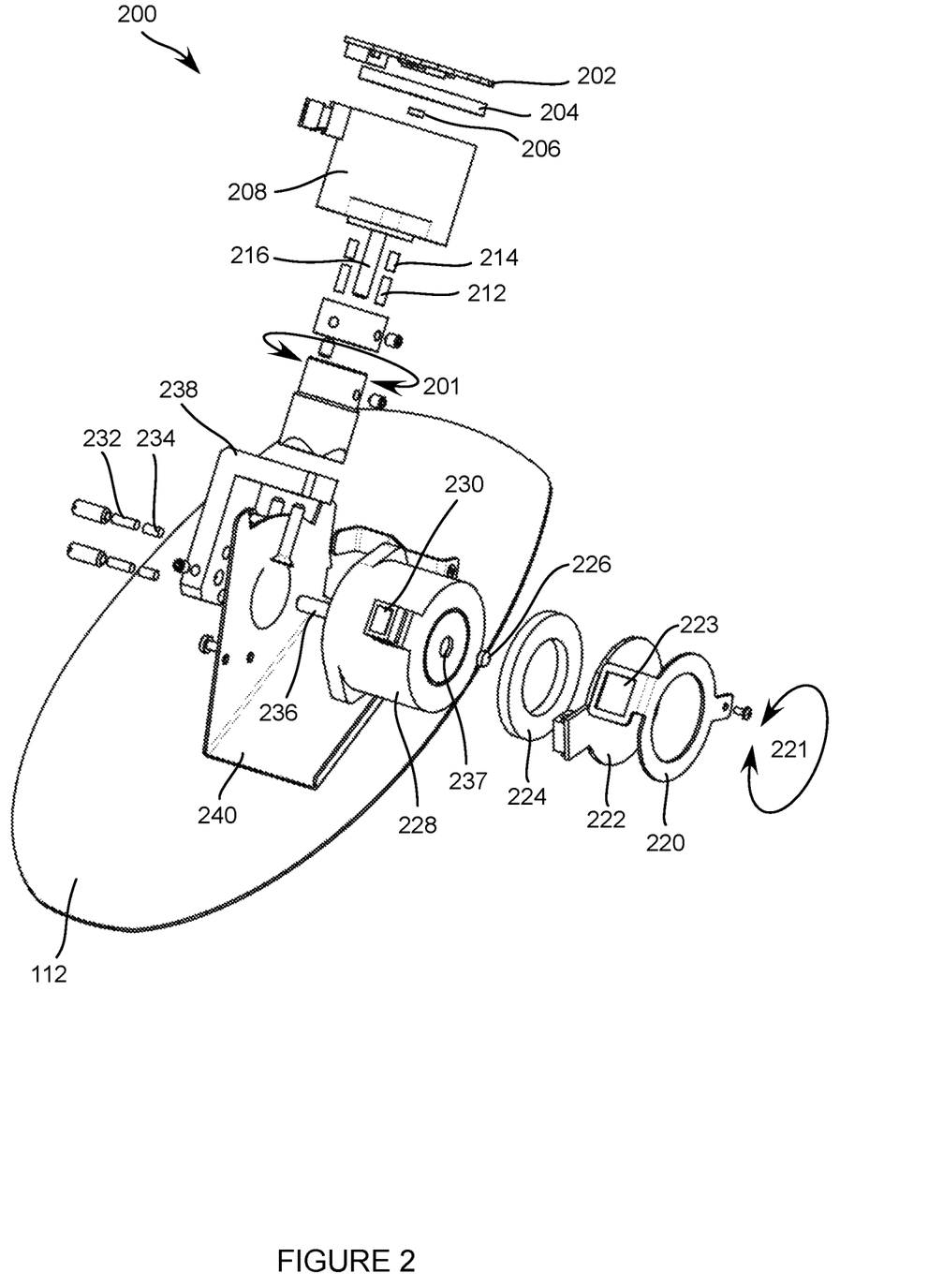
FIG. 2 presents an exploded view of a moving-mirror motion system according to the disclosure.

FIG. 2 presents an exploded view of a moving-mirror motion system 200 according to the disclosure. A tilt motion assembly of the motion system 200 includes a mirror support bracket 240, a tilt motor 228, and a mirror yoke 238. The mirror 112 is fixedly attached to the mirror support bracket 240, which, in turn, is fixedly attached to a body of the tilt motor 228. A shaft 236 of the tilt motor 228 passes through a clearance hole in the mirror support bracket 240 and is fixedly attached to the mirror yoke 238. The mirror 112, the mirror support bracket 240, and the tilt motor 228 are configured to rotate together about the shaft 236 in a first rotational direction 221.

The tilt motion assembly is a direct drive mechanism; that is, the shaft 236 is directly coupled to the mirror yoke 238, there is no gear, belt, or other reduction drive between the shaft 236 and the mirror yoke 238. A change in the rotational position of the shaft 236 relative to the tilt motor 228 causes an equal change in the rotational position of the mirror 112. That is, a 20° rotation of the shaft 236 causes a 20° rotation of the mirror 112.

A pan motion assembly of the motion system 200 includes the mirror yoke 238 and a pan motor 208. The mirror yoke 238 is fixedly attached to a shaft 216 of the pan motor 208 such that the mirror yoke 238, and the connected assembly comprising the mirror 112 and the tilt motion assembly is free to rotate relative to a body of the pan motor 208 in a second rotational direction 201. The second rotational direction 201 is orthogonal to the first rotation direction 221.

The pan motion assembly is also a direct drive mechanism; that is, the shaft 216 is directly coupled to the mirror yoke 238. A change in the rotational position of the shaft 216 relative to the pan motor 208 causes an equal change in the rotational position of the tilt motion assembly and the mirror 112. That is, a 20° rotation of the shaft 216 causes a 20° rotation of the tilt motion assembly and the mirror 112.

A tilt disturbance sensing system according to the disclosure comprises a tilt magnet 226 and a tilt sensor circuit board 222. The tilt magnet 226 is attached to an end 237 of the shaft 236 such that the tilt magnet 226 rotates with the shaft 236 relative to the tilt motor 228. The tilt magnet 226 is a two-pole diametric magnet having a magnetic polarity across a diameter of a face of the tilt magnet 226; that is, the tilt magnet 226 is a disc with a magnetic pole extending between opposing edges of the disc. The magnetic pole of the tilt magnet 226 is oriented orthogonally to the axis of rotation of the shaft 236. The diameter of the tilt magnet 226 is preferably substantially equal to a diameter of the shaft 236 to facilitate aligning a center of the tilt magnet 226 with a longitudinal center of the shaft 236.

The tilt sensor circuit board 222 is fixedly attached to the body of the tilt motor 228 using adhesive tape 224 or another suitable attachment mechanism. So configured, the tilt sensor circuit board 222 rotates relative to the tilt magnet 226 as the tilt motor 228 rotates. In some embodiments, a sensor retention bracket 220 is added to further secure the tilt sensor circuit board 222 to the body of the tilt motor 228, as well as to protect the tilt sensor circuit board 222 from physical damage. The sensor retention bracket 220 may be prevented from rotation relative to the body of the tilt motor 228 via an opening 223 which surrounds a tilt motor connector 230 (or other protruding component of the tilt motor 228) and is thereby constrained from movement.

Similarly, a pan disturbance sensing system according to the disclosure comprises a pan magnet 206 and a pan sensor circuit board 202. The pan magnet 206 is a two-pole diametric magnet attached to an end of the shaft 216 such that the pan magnet 206 rotates with the shaft 216 relative to the body of the pan motor 208. The pan magnet 206 is also a two-pole diametric magnet with its magnetic pole oriented orthogonally to the axis of rotation of the shaft 216. The pan sensor circuit board 202 is fixedly attached to the body of the pan motor 208 using adhesive tape 204 or another suitable attachment mechanism. So configured, the pan magnet 206 will rotate relative to the pan sensor circuit board 202 as the shaft 216 rotates.

In other embodiments, one or both of the tilt magnet 226 and the pan magnet 206 may be a bar magnet mounted across an end of its associated motor shaft, with the magnetic pole of the bar magnet oriented orthogonal to the axis of rotation of the associated shaft. In some such embodiments, such a bar magnet may be encased in a disc made of resin or other non-magnetic material to facilitate aligning the bar magnet with the center of the associated shaft.

In some embodiments, one or both of the pan and tilt motion axes may be fitted with friction brakes so as to dampen vibration in movement of the mirror in that axis. In the moving-mirror motion system 200, a tilt friction brake includes a polytetrafluoroethylene (PTFE) plunger 234 and a spring 232, which are fixedly mounted to the mirror yoke 238, with the spring 232 configured to press (or bias) the PTFE plunger 234 against the mirror support bracket 240 as it rotates relative to the mirror yoke 238. A pan friction brake includes a PTFE plunger 214 and a spring 212, which are fixedly mounted to the mirror yoke 238 and configured to press the PTFE plunger 214 against the body of the pan motor 208 as the mirror yoke 238 rotates relative to the body of the pan motor 208.

While the moving-mirror motion system 200 includes a disturbance sensing system on both the tilt motion assembly and the pan motion assembly, it will be understood that in other embodiments a disturbance sensing system may be provided on only the tilt motion assembly or only the pan motion assembly.

Figure 3:
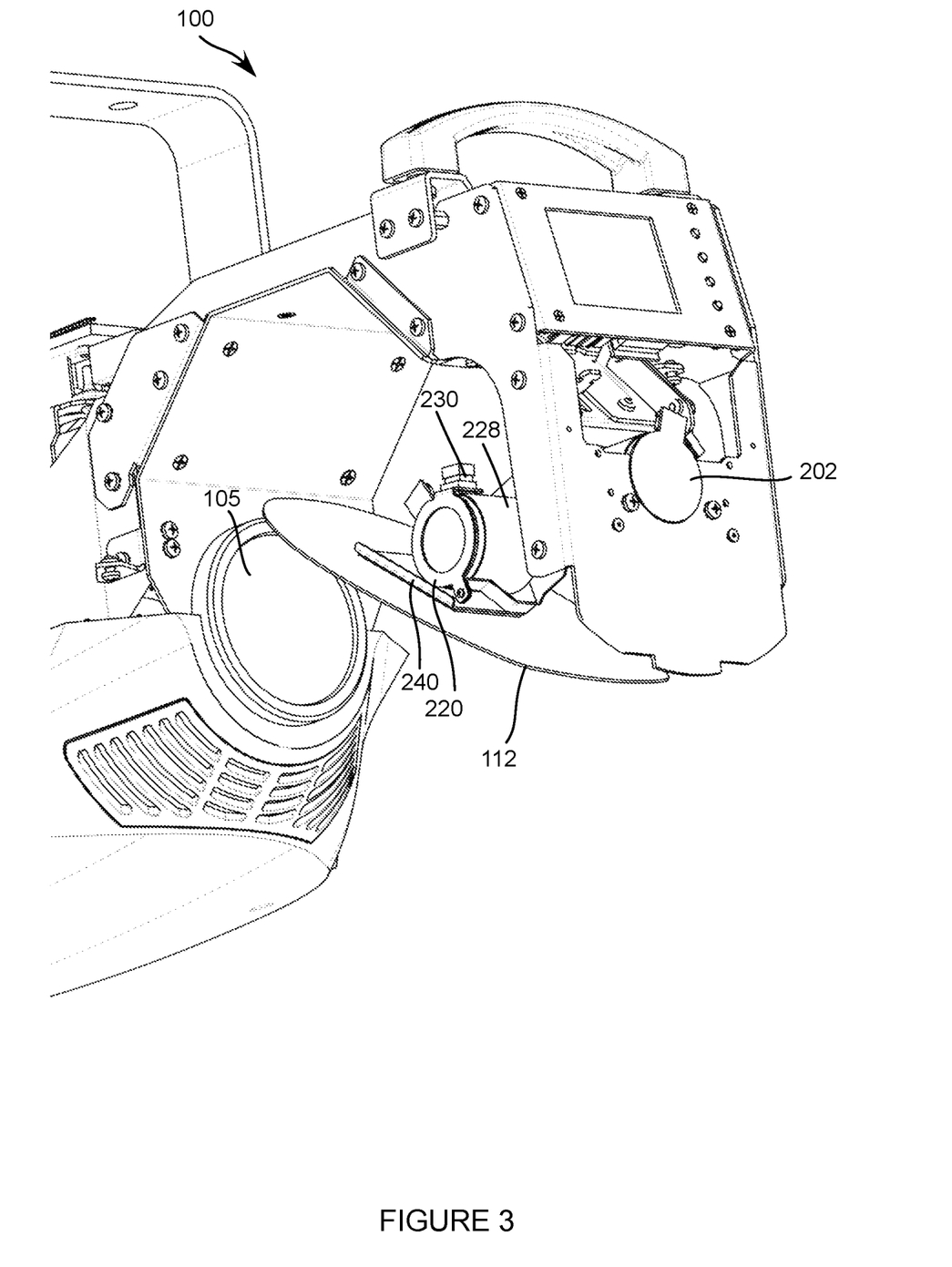
FIG. 3 presents a view of the moving-mirror motion system of FIG. 2, installed in the automated luminaire of FIG. 1.

FIG. 3 presents a view of the moving-mirror motion system 200 of FIG. 2, installed in the automated moving-mirror luminaire 100 of FIG. 1. As described with reference to FIG. 1, the light beam from the internal light source and optical systems (not shown) is emitted through the lens 105 and impinges on the mirror 112. Visible in this view are the mirror 112, the mirror support bracket 240, the tilt motor 228, the tilt motor connector 230, the sensor retention bracket 220, and the pan sensor circuit board 202.

Figure 4:
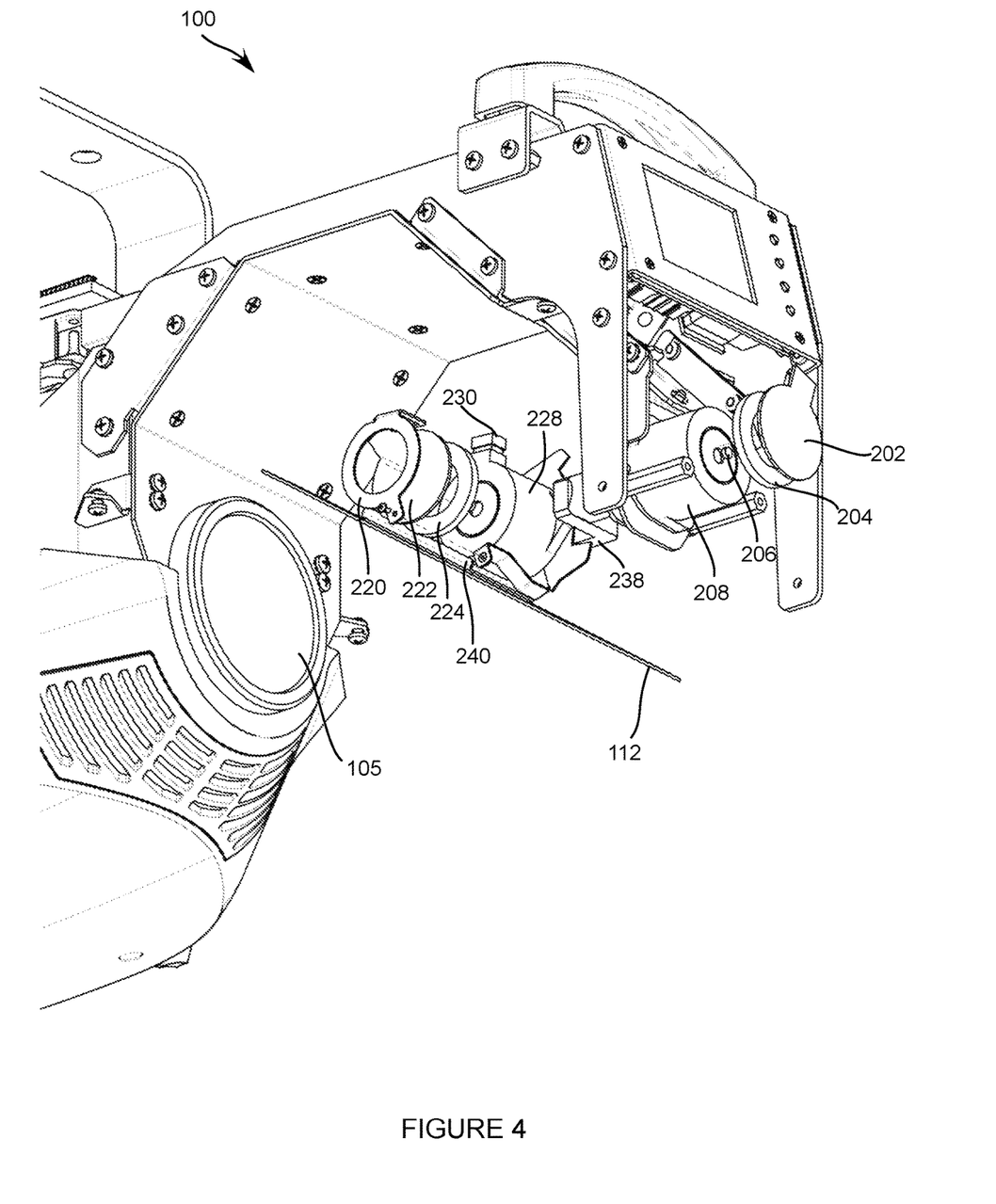
FIG. 4 shows an exploded view of the moving-mirror motion system of FIG. 3.

FIG. 4 shows an exploded view of the moving-mirror motion system 200 of FIG. 3. The moving mirror sensor and motor systems described with reference to FIG. 2 are shown as an exploded diagram in-situ within the automated moving-mirror luminaire 100.

Figure 5:
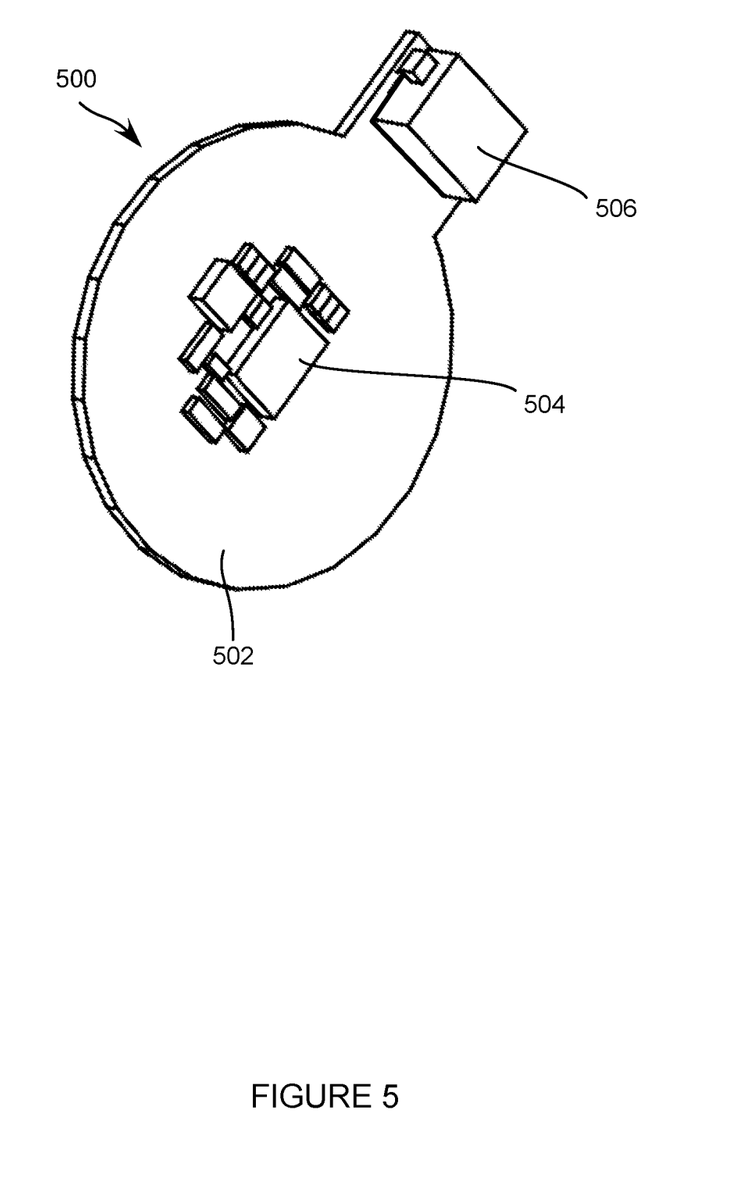
FIG. 5 shows a view of a sensor circuit board according to the disclosure.

FIG. 5 shows a view of a sensor circuit board 500 according to the disclosure. The sensor circuit board is suitable for use as either the tilt sensor circuit board 222 or the pan sensor circuit board 202, described with reference to FIG. 2. The tilt sensor circuit board 222 or the pan sensor circuit board 202 may alternatively be referred to as a motion sensor system.

The sensor circuit board 500 comprises a substrate 502 on which are mounted electrical and electronic components including a magnetic sensor 504 and a connector 506. The magnetic sensor 504 may be a magnetic rotary position sensor such as the AS5040 Rotary Sensor manufactured by the company AMS AG of Premstaetten, Austria, or other suitable magnetic sensor that produces an output signal representing an absolute rotational position of a two-pole magnet. The connector 506 provides electrical power and control signal connection to the magnetic sensor 504.

Figure 6:
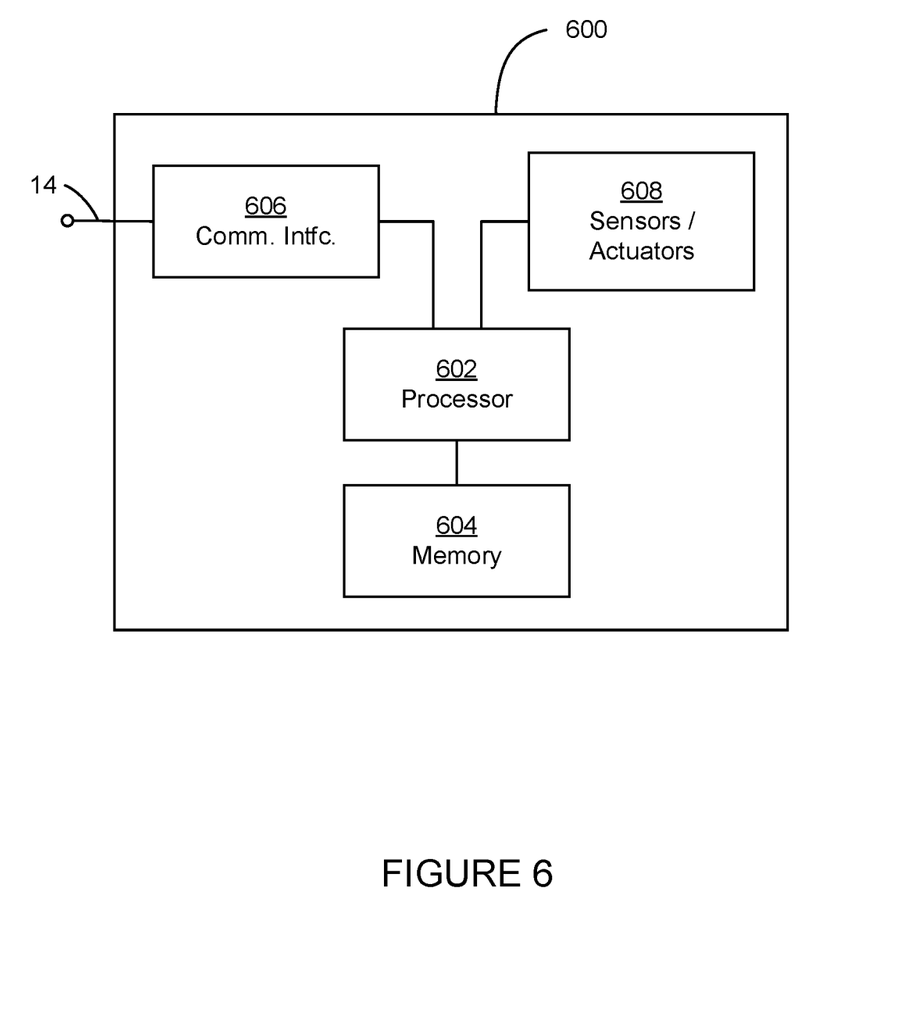
FIG. 6 presents a block diagram of a control system for an automated moving-mirror luminaire according to the disclosure.

FIG. 6 presents a block diagram of a control system (or controller) 600 for the automated moving-mirror luminaire 100, according to the disclosure. The control system 600 is suitable for use with a disturbance sensing and motor control system 700 described with reference to FIG. 7 or with other disturbance sensing systems according to the disclosure. The control system 600 is also suitable for controlling other parameter control functions of the automated moving-mirror luminaire 100, including, for example, intensity, color, focus, beam size, beam shape, and/or beam pattern.

The control system 600 includes a processor 602 electrically coupled to a memory 604. The processor 602 is implemented by hardware and software. The processor 602 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 602 is further electrically coupled to and in communication with a communication interface 606. The communication interface 606 is coupled to, and configured to communicate via, a data link 14. The processor 602 is also coupled via a control interface 608 to one or more sensors, motors, actuators, controls and/or other devices. The processor 602 is configured to receive control signals via the communication interface 606 from the data link 14 and to control the disturbance sensing and motor control system 700, as well as other mechanisms of the automated moving-mirror luminaire 100 via the control interface 608. Sensor inputs, such as the motion sensor system outputs described herein, are received through control interface 608.

The control system 600 is suitable for implementing processes, motion control, control of the motor currents and responding to inputs from a motion sensor system, and other functionality as disclosed herein. Such control may be implemented as instructions stored in the memory 604 and executed by the processor 602. The memory 604 may be volatile and/or non-volatile and may be read-only memory (ROM), random access memory (RAM), ternary content-addressable memory (TCAM), and/or static random-access memory (SRAM). The memory 604 may comprise one or more disks, tape drives, and/or solid-state drives and may use such disks and drives as overflow data storage devices, to store programs when such programs are selected for execution, and to store instructions and data that are read during program execution.

Figure 7:
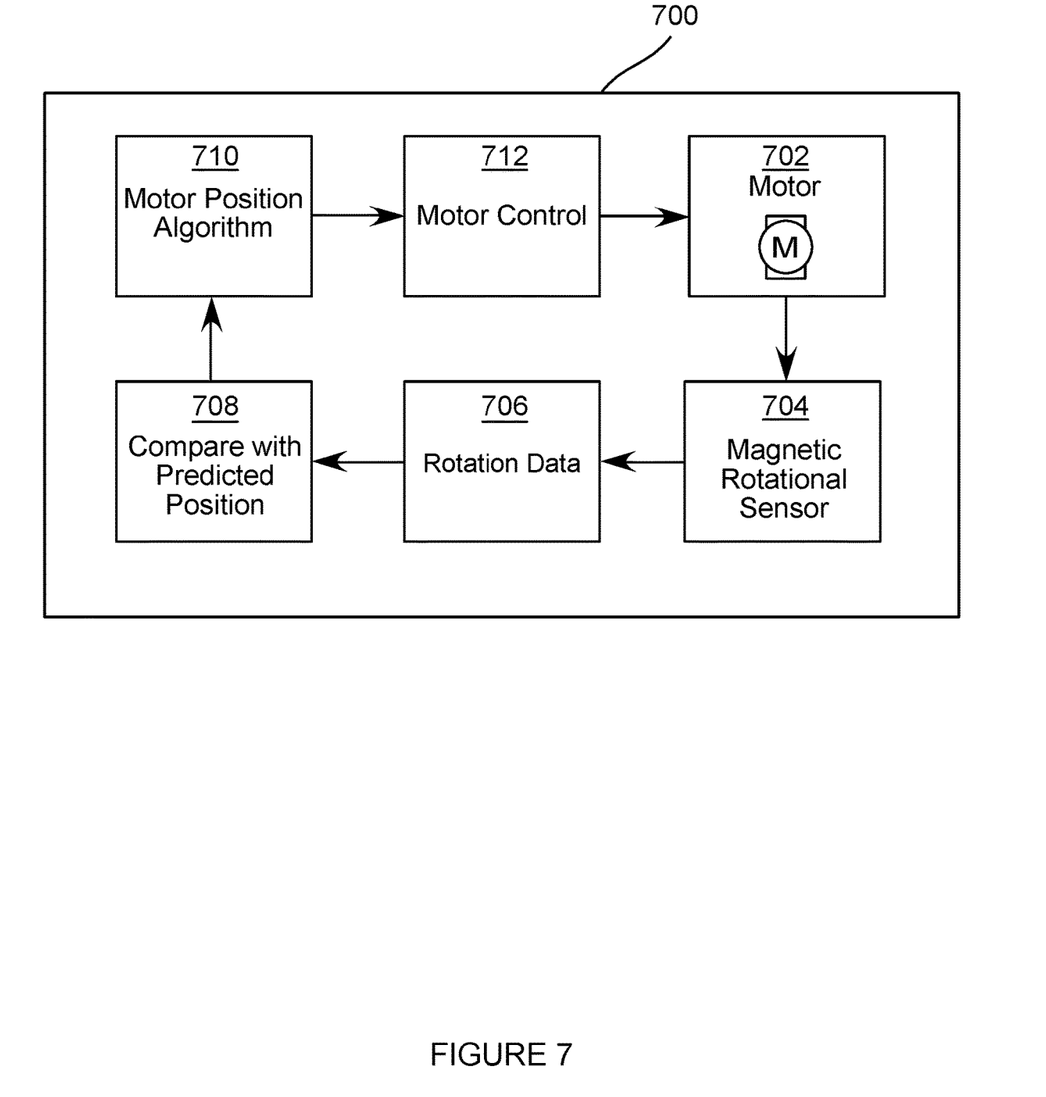
FIG. 7 presents a block diagram of a disturbance sensing and motor control system according to the disclosure.

FIG. 7 presents a block diagram of a disturbance sensing and motor control system 700 according to the disclosure. The disturbance sensing and motor control system 700 may be implemented by the controller 600. A motor 702 (which may be either the pan motor 208 or the tilt motor 228) has an attached magnet which interacts with a magnetic rotational sensor system 704. The magnetic rotational sensor system 704 produces a digital rotation data signal 706 representing a sensed absolute rotational position of a shaft of the motor 702. A comparator 708 receives the rotation data signal 706 and compares it with an expected (or predicted) rotational position stored in the disturbance sensing and motor control system 700. If these two positions differ by more than a threshold amount (which is 0.1° in some embodiments of the disclosure), then correction data is sent to a motor position algorithm system 710, which sends commands to a motor control system 712 to move the motor 702 to a rotational position where the sensed rotational position matches the stored expected rotational position.

In other embodiments, the magnetic rotational sensor system 704 produces an incremental rotation data signal representing (i) an increment of change of rotational position of the magnet attached to the shaft of the motor 702 and (ii) a rotational direction of that change. In such embodiments, the magnetic rotational sensor system 704 or other element of the disturbance sensing and motor control system 700 calculates the (absolute) digital rotation data signal 706 based on a stored prior absolute rotational position of the shaft of the motor 702 and the incremental rotation data signal produced by the magnetic rotational sensor system 704. In such embodiments, the comparator 708 compares the calculated rotation data signal 706 with the expected (or predicted) rotational position stored in the disturbance sensing and motor control system 700.

In some embodiments of the disclosure, the disturbance sensing and motor control system 700 may poll the magnetic rotational sensor system 704 on a regular basis while the motor 702 is moving as well as when it is stationary. In other embodiments, the magnetic rotational sensor system 704 may only be polled when the motor 702 is stationary so as not to interfere with smooth movement of the mirror 112. In either such embodiment, the polling rate is between 10 and 50 polls per second.

In some embodiments, the disturbance sensing and motor control system 700 may be characterized as running open-loop with error correction, rather than as a closed-loop feedback system. Such open-loop systems may run slower and at a lower priority than a closed-loop system would require, requiring less processing bandwidth from the controller 600 or the disturbance sensing and motor control system 700. Such low priority error-correction approach is possible in the embodiments described herein because of the inherent positional accuracy of stepper motors, where errors in position are typically caused by an outside disturbance such as a collision or by electrical or physical interference.

The control system 600 receives control signals via the communication interface 606 indicating a desired mirror position of the mirror 112. The control system translates the desired mirror position of the mirror 112 into desired rotational positions of the pan motor 208 and the tilt motor 228 and causes the motor position algorithm system 710 to move the pan motor 208 and the tilt motor 228 to the desired rotational positions to move the mirror 112 to the desired mirror position. Once the motor position algorithm system 710 moves the pan motor 208 and the tilt motor 228 to the desired rotational positions, the control system 600 stores the desired rotational positions as the stored expected rotational positions for the pan motor 208 and the tilt motor 228.

While the disclosure has been described with respect to a limited number of embodiments, those skilled in the art, having benefit of this disclosure, will appreciate that other embodiments may be devised which do not depart from the scope of the disclosure herein. While the disclosure has been described in detail, it should be understood that various changes, substitutions and alterations can be made hereto without departing from the spirit and scope of the disclosure.

What is claimed is:

1. A luminaire comprising:
   a mirror configured to controllably deflect a light beam emitted from the luminaire;
   a motion assembly comprising:
      a motor mechanically coupled to the mirror and configured to rotate the mirror about a mirror axis of rotation, where a change in a rotational position of a shaft of the motor relative to a body of the motor causes an equal change in a rotational position of the mirror;
      a magnet mounted directly to a shaft of the motor, a center of the magnet being aligned with a shaft axis of rotation of the shaft and a magnetic pole of the magnet being oriented orthogonally to the shaft axis of rotation;
      a motion sensor system configured to produce an output signal representing an absolute rotational position of the magnet; and
   a control system electrically coupled to the motor and the motion sensor, the control system configured to:
      store an expected rotational position of the motor,
      determine whether the output signal produced by the motion sensor matches the stored expected rotational position,
      based on the determination that the output signal does not match the stored expected rotational position, cause the motor to rotate to a rotational position where the output signal produced by the motion sensor matches the stored expected rotational position,
      receive a control signal indicating a desired mirror position of the mirror,
      translate the desired mirror position into a desired rotational position of the motor,
      cause the motor to move to the desired rotational position, and
      store the desired rotational position as the stored expected rotational position.

2. The luminaire of claim 1, wherein the magnet is a two-pole diametric magnet.

3. The luminaire of claim 1, wherein the motion sensor is fixedly coupled to the body of the motor.

4. The luminaire of claim 3, further comprising a sensor retention bracket configured to protect the motion sensor from physical damage.

5. The luminaire of claim 1, wherein the motion sensor system is configured to produce the output signal by processing incremental rotation data representing (i) an increment of change of rotational position of the magnet and (ii) a rotational direction of the increment of change.

6. The luminaire of claim 1, further comprising a friction brake configured to dampen vibration in movement of the mirror.

7. The luminaire of claim 6, wherein the friction brake comprises a polytetrafluoroethylene (PTFE) plunger and a spring.

8. The luminaire of claim 7, wherein the PTFE plunger and the spring are coupled to the mirror and the spring is configured to bias the PTFE plunger into contact with a body of the motor.

9. The luminaire of claim 1, wherein the control system is configured to determine that the output signal produced by the motion sensor matches the stored expected rotational position when the output signal produced by the motion sensor is within 0.1° of the stored expected rotational position.

10. The luminaire of claim 1, wherein the control system is configured to determine whether the output signal matches the stored expected rotational position only when the motor is not rotating the mirror.

11. A luminaire comprising:
    a mirror configured to controllably deflect a light beam emitted from the luminaire;
    a tilt motion assembly comprising:
       a tilt motor mechanically coupled to the mirror and configured to rotate the mirror about a tilt axis of rotation, where a change in a rotational position of a tilt shaft of the tilt motor relative to a body of the tilt motor causes an equal change in a rotational position of the mirror;
       a tilt magnet mounted directly to the tilt shaft, a center of the tilt magnet being aligned with a tilt shaft axis of rotation of the tilt shaft and a magnetic pole of the tilt magnet being oriented orthogonally to the tilt shaft axis of rotation; and a tilt motion sensor system configured to produce a tilt output signal representing an absolute rotational position of the tilt magnet;

a pan motion assembly comprising:

a pan motor mechanically coupled to the tilt motion assembly and configured to rotate the tilt motion assembly about a pan axis of rotation, where a change in a rotational position of a pan shaft of the pan motor relative to a body of the pan motor causes an equal change in a rotational position of the tilt motion assembly;

a pan magnet mounted directly to a pan shaft of the pan motor, a center of the pan magnet being aligned with a pan shaft axis of rotation of the pan shaft and a magnetic pole of the pan magnet being oriented orthogonally to the pan shaft axis of rotation; and a pan motion sensor system configured to produce a pan output signal representing an absolute rotational position of the pan magnet; and a control system electrically coupled to the pan and tilt motors and the pan and tilt motion sensor systems, the control system configured to:

store an expected pan rotational position of the pan motor and an expected tilt rotational position of the tilt motor, based on a determination that the tilt output signal does not match the stored expected tilt rotational position, cause the tilt motor to rotate to a rotational position where the tilt output signal matches the stored expected tilt rotational position, based on a determination that the pan output signal does not match the stored expected pan rotational position, cause the pan motor to rotate to a rotational position where the pan output signal matches the stored expected pan rotational position, receive a control signal indicating a desired mirror position of the mirror, translate the desired mirror position into a desired pan rotational position of the pan motor and a desired tilt rotational position of the tilt motor, cause the pan motor to move to the desired pan rotational positions, cause the tilt motor to move to the desired tilt rotational positions, store the desired pan rotational position as the stored expected pan rotational position, and store the desired tilt rotational position as the stored expected tilt rotational position.

12. The luminaire of claim 11, wherein one or both of the tilt magnet and the pan magnet is a two-pole diametric magnet.

13. The luminaire of claim 11, wherein the tilt motion sensor system is fixedly coupled to the body of the tilt motor and the pan motion sensor system is fixedly coupled to the body of the pan motor.

14. The luminaire of claim 11, wherein:

the tilt motion sensor system is configured to produce the tilt output signal by processing tilt incremental rotation data representing (i) a tilt increment of change of rotational position of the tilt magnet and (ii) a rotational direction of the tilt increment of change; and the pan motion sensor system is configured to produce the pan output signal by processing pan incremental rotation data representing (i) a pan increment of change of rotational position of the pan magnet and (ii) a rotational direction of the pan increment of change.

15. The luminaire of claim 11, further comprising a friction brake configured to dampen vibration in movement of the mirror in one of the tilt axis of rotation and the pan axis of rotation.

16. The luminaire of claim 11, wherein the control system is configured to:

determine whether the tilt output signal matches the stored expected tilt rotational position only when the tilt motor is not rotating the mirror; and determine whether the pan output signal matches the stored expected pan rotational position only when the pan motor is not rotating the tilt motion assembly.

* * * * *